United States Patent Office 3,433,970
Patented Mar. 18, 1969

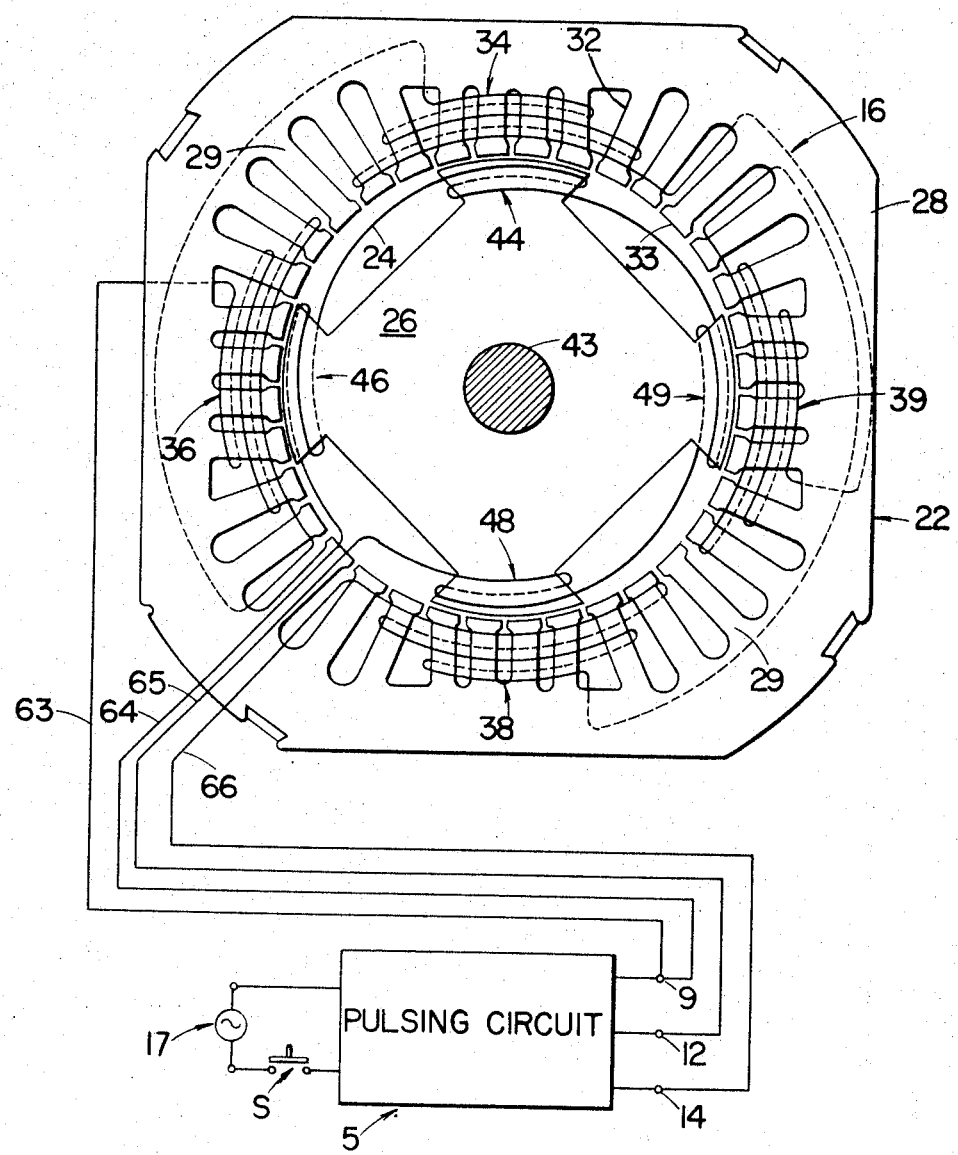

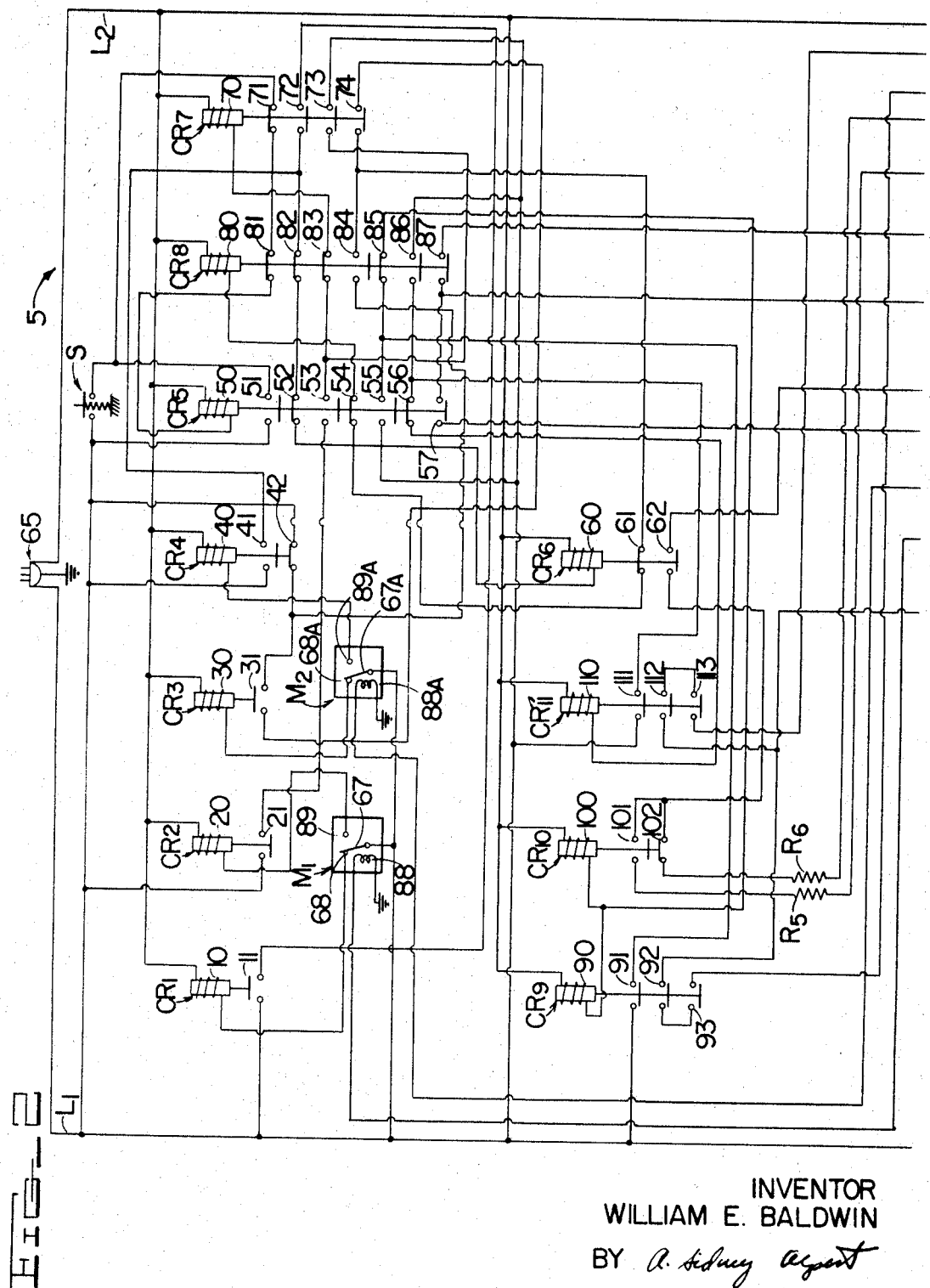

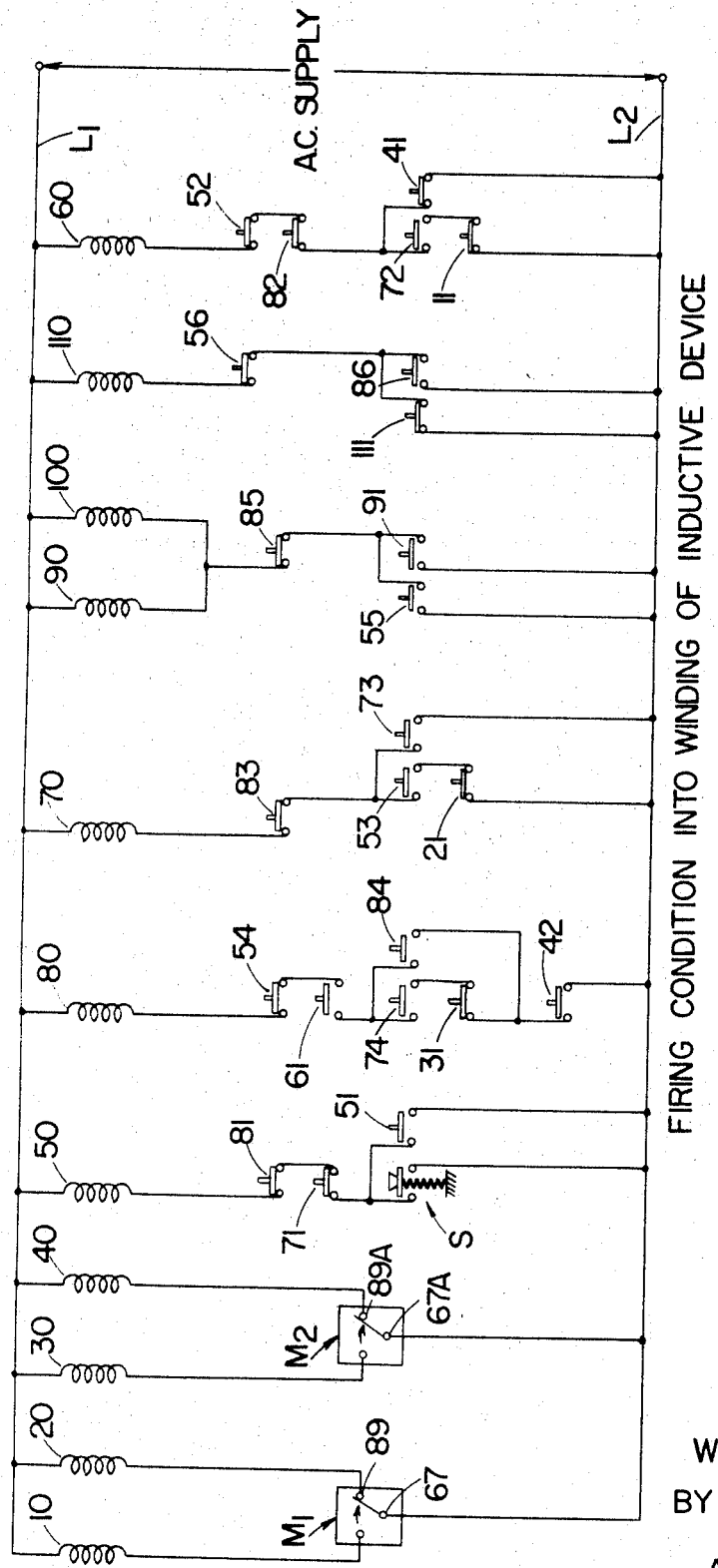

3,433,970
ELECTRICAL PULSING CIRCUIT WITH AUTOMATIC SWITCHING MEANS
William E. Baldwin, Fort Wayne, Ind., assignor to General Electric Company, a corporation of New York
Filed July 28, 1966, Ser. No. 568,585
U.S. Cl. 307—11      7 Claims
Int. Cl. H02j 3/38; H01f 27/42

*Background of the invention*

This invention relates generally to an electrical pulsing circuit with automatic switching means, and more particularly to an improved electrical energy pulsing circuit including automatic switching means for sequentially injecting a first level of energy into a first load and a second level of energy into a second load.

In the United States patent application of Richard D. Gibbs, Ser. No. 568,605, assigned to the same assignee and now Patent 3,407,474, there is disclosed a novel method as well as apparatus for developing the windings of inductive devices such as motor stators and rotors. In one exemplification disclosed in the Gibbs patent, the stator winding is initially placed into the slots of the stator core and electrical inductive apparatus is positioned in magnetic coupling relation with the stator winding. A pulse or surge of electrical energy is injected into the electrical inductive apparatus as the stator winding is electrically short circuited, i.e. connected to provide a closed electrical path. A second pulse or surge of energy is then injected into the stator winding as the electrical inductive apparatus is electrically short circuited.

It is highly desirable to provide an electrical pulsing circuit having switching means capable of first connecting a capacitor bank or other suitable energy storage means to the electrical inductive apparatus and short circuiting the stator winding, and then automatically switching and connecting the capacitor bank to the stator winding and short circuiting the electrical inductive apparatus. It is also desirable to provide an economical, fully automatic switching means with an operative life commensurate with the other components of the pulsing circuit. In addition, it is advantageous to provide the electrical pulsing circuit with means for controlling the energy level at which the pulses or surges are automatically and sequentially applied into the electrical inductive apparatus and into the stator winding. It is still further desirable to provide an automatic pulsing circuit which operates rapidly, efficiently and safely, which is maintenance free in position, and which is capable of supplying relatively high energy levels, by way of exemplification for one application, in the order of 1020 joules at 1800 volts, as well as relatively low energy levels.

*Summary of the invention*

Accordingly, it is an object of the instant invention to provide an electrical circuit arrangement which incorporates at least some of the desirable features mentioned above.

It is another object of the present invention to provide an improved electrical pulsing circuit which is capable of automatically, rapidly and safely switching between first and second load circuits thereby enabling the first and second load circuits to be sequentially pulsed.

It is a still further object of the present invention to provide an improved electrical energy pulsing circuit capable of automatic switching for sequentially supplying a first level of energy to a first load while shorting out the second load and then supplying a second level of energy to the second load while shorting out the first load.

Briefly stated, in accordance with one form of my invention, I provide an improved pulsing circuit including an energy storage means in the form of a bank of storage capacitors, and first and second voltage sources for charging the storage capacitors to first and second preselected energy levels. In order to charge the capacitors, I have provided the pulsing circuit with a control circuit portion having a first charge level control means for coupling the first voltage source and a charging circuit means to the capacitors, and a second charge level control means for coupling the second voltage source and the charging circuit means to the capacitors. The pulsing circuit is connected, by way of exemplification, to a stator winding and an inductive device. The pulsing circuit includes a first switch means responsive to the initial energization of the charging circuit means for short circuiting the stator winding and coupling the capacitors to the inductive device. It also includes a second switch means for short circuiting the inductive device and coupling the capacitors to the stator winding.

According to one exemplification of my invention, the pulsing circuit includes means for sensing the energy level to which the capacitors are charged, and means for energizing a firing circuit in order to sequentially discharge the capacitors into the inductive device and then discharge the capacitors into the stator winding.

An important advantage of the invention is that the switching operation and sequential discharging of the capacitors into the inductive device and the stator winding are accomplished automatically, efficiently and rapidly. Further, the pulsing circuit requires no manual intervention after its initial energization, and is, therefore, readily adaptable for the mass production of stators.

*Brief description of the drawings*

The subject matter which I regard as my invention is particularly pointed out and distinctly claimed in the concluding portion of this specification. My invention, however, together with further objects and advantages thereof, may be best understood with reference to the following description taken in conjunction with the accompanying drawings in which:

FIGURE 1 is an end view of a stator core having an electrical inductive apparatus in the bore thereof, with the stator winding and electrical inductive apparatus shown diagrammatically as connected to the electrical pulsing circuit comprising my invention;

FIGURE 2 (continued) is a schematic circuit diagram of the remainder of the circuit illustrated in FIGURE 2;

FIGURE 4 is a simplified schematic diagram similar to that of FIGURE 3 showing the circuit in a second firing condition.

*Description of the preferred embodiments*

Figure 2:
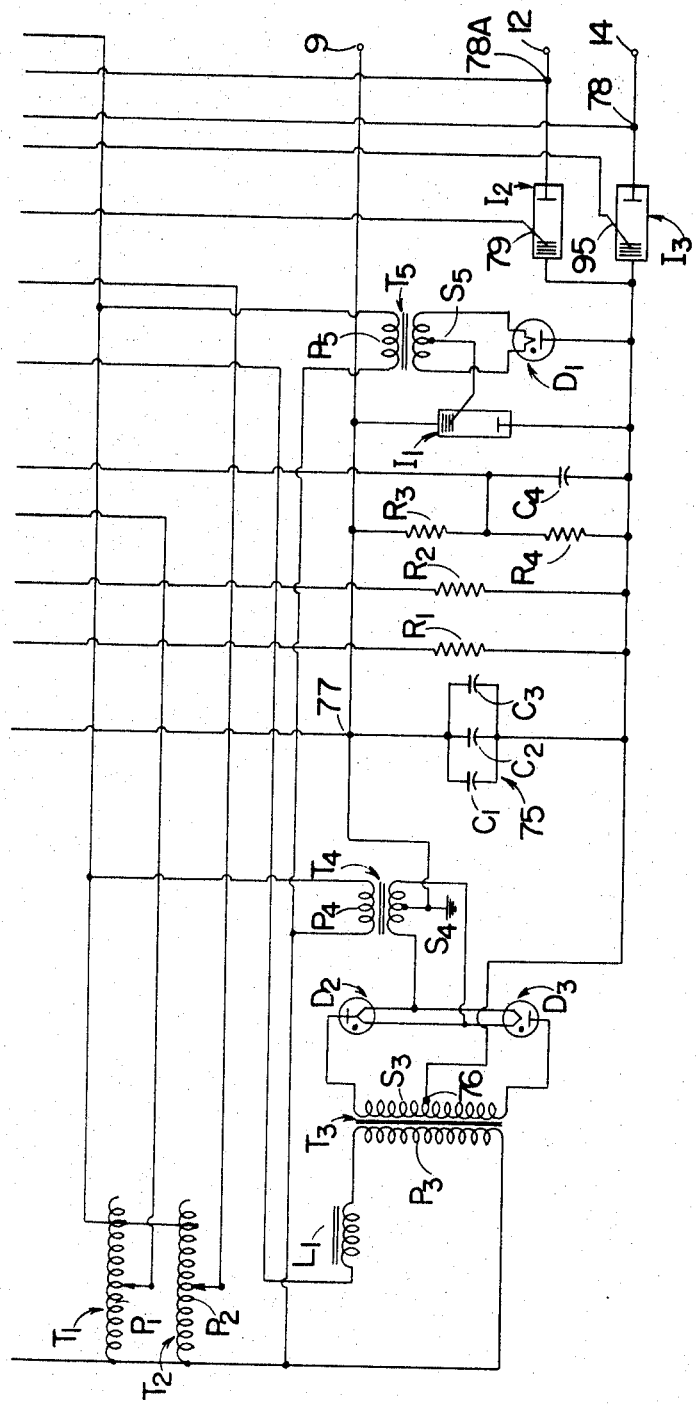
FIGURE 2 is a schematic circuit diagram of a portion of the electrical pulsing circuit embodying my invention.

Referring now more particularly to the drawings, and especially to FIGURE 1, I have illustrated therein my pulsing circuit generally denoted by reference numeral 5 connected to a suitable source of electrical energy such as a 120 volt, 60 cycle power source 17. The pulsing circuit includes three output terminals 9, 12 and 14, the terminal 9 comprising a common terminal for two load connections. The pulsing circuit 5 is schematically illustrated as connected to two load circuits, one of which comprises the winding 16 of a magnetic stator core 22, the other of which comprises the coil or winding 24 of an electrical inductive apparatus such as that disclosed in the copending United States patent application of Clovis E. Linkous, Ser. No. 414,825, now patent No. 3,333,330. The stator core 22 is of generally conventional configuration including a yoke section 28 and a plurality of teeth 29 defining a bore 33 and having therebetween a plurality of slots 32. The slots 32 have four coil groups 34, 36, 38 and 39 of the distributed wound type therein, the four coil groups collectively comprising the stator winding 16. The inductive apparatus 26 is supported in the bore 33 of the stator by a suitable supporting means 43. The winding 24 of the inductive apparatus 26 includes four serially connected coils 44, 46, 48 and 49, which coils are respectively positioned adjacent the coil groups 34, 36, 38 and 39.

In operation, my circuit will electrically short circuit the stator winding 16 and inject a first energy pulse into the winding 24 of the inductive apparatus 26. The winding 24 will then be short circuited and a pulse of electrical energy injected into the stator winding 16. My arrangement provides for automatically switching and sequentially injecting energy surges or pulses into the inductive apparatus winding and stator winding.

In actual practice, my improved circuit arrangement has utilized a capacitor bank of 610 microfarads (630 microfarads rated) to supply first and second energy pulses of varying magnitudes. In one application for a given stator winding, a first pulse of 1800 volts and of approximately 8000 amperes (peak) was injected into the winding 24 as the stator winding was short circuited, the total pulse time being about 6 microseconds in duration, and the energy supplied being 1020 joules. A second pulse, at 1600 volts and approximately 500 amperes (peak), was applied into the stator winding 16 with the winding 24 short circuited, the total pulse time being about 5 milliseconds in duration, and the energy supplied being at 800 joules.

In accordance with my invention, in the illustrated exemplification thereof, the pulsing circuit 5 includes means for automatically effecting a switching and pulse injecting operation. In this regard, I connect first output leads 63 and 64 of the stator winding 16 and winding 24 of the electrical inductive apparatus 26 respectively to the common terminal 9 of the pulsing circuit 5, and the second output leads 65 and 66 of the stator winding 16 and winding 24 respectively to the pulsing circuit terminals 12 and 14.

Figure 3:
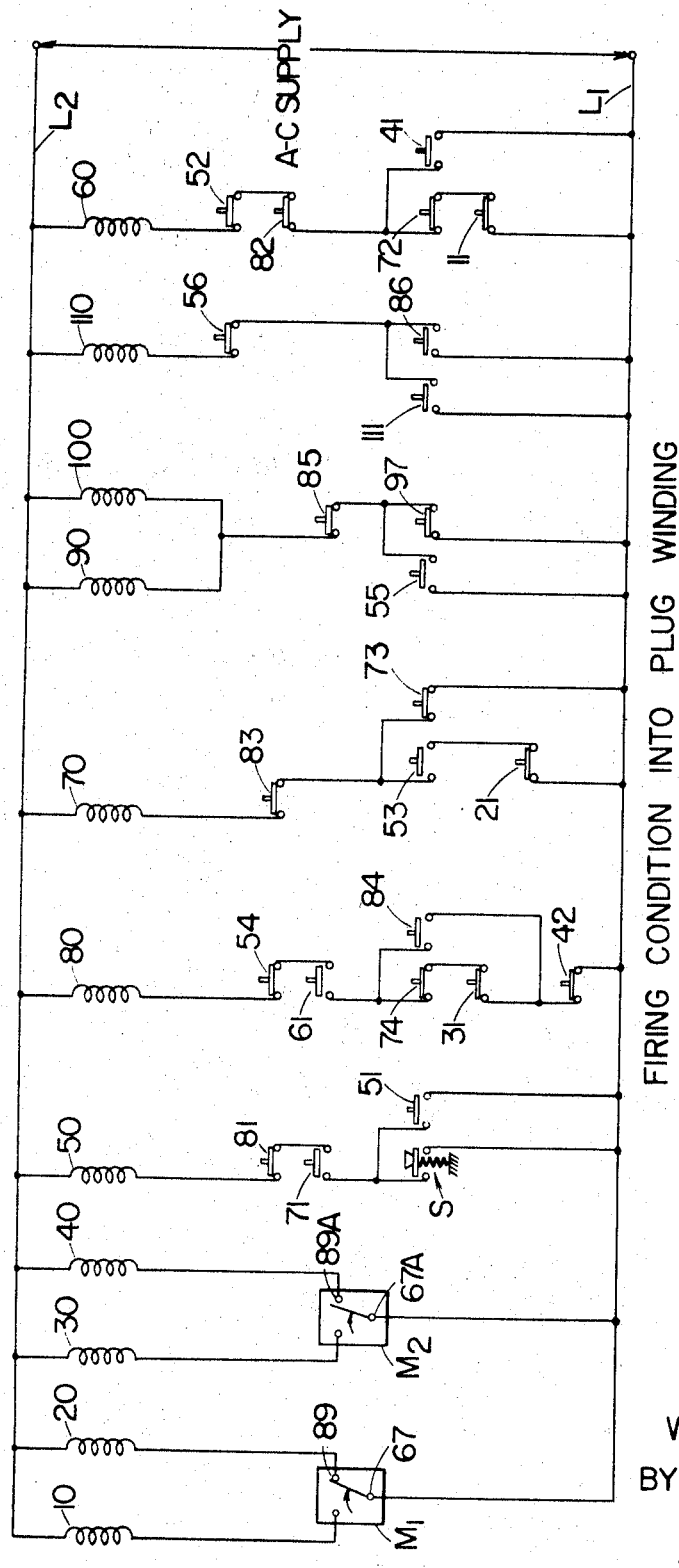
FIGURE 3 is a simplified schematic diagram of a portion of the electrical pulsing circuit shown in FIGURES 2 and 2 (continued) showing the circuit in a first firing condition.

Having more specific reference to FIGURES 2, 3, and 4, in the illustrated exemplification of the invention, the pulsing circuit 5 is adapted to inject a first surge of electrical energy into the winding 24 connected at output terminals 9, 12 by discharging a capacitor bank 75 consisting of capacitors $C_1$, $C_2$, and $C_3$, charged to a preselected voltage level, charging the capacitor bank 75 to a second preselected voltage level, and discharging the capacitor bank to inject a second pulse of electrical energy into the stator winding 16 connected at the output terminals 9, 14. Further, when the first pulse of electrical energy is injected into the winding 24, the stator winding is automatically short circuited, and likewise when the second pulse of electrical energy is injected into the stator winding, the winding 24 is automatically short circuited. My pulsing circuit 5 sequentially applies the pulses across the proper output terminals while it automatically short circuits the other output terminals.

In order to sequentially inject energy surges from the capacitor bank 75 into the first and second load circuits, the pulsing circuit 5 includes a charging circuit means including a transformer $T_3$, and first and second voltage sources comprising autotransformers $T_1$ and $T_2$. The circuit 5 further includes a firing circuit including capacitor $C_4$ and ignitrons $I_2$ and $I_3$, a control circuit including a first charge level control means for coupling transformer $T_1$ to the capacitor bank 75 in order to establish a first charge level on the capacitor bank and a second charge level control means for coupling the transformer $T_2$ to the capacitor bank 75 for charging the bank to a second energy level. First sensing circuit means is provided and includes a well known meter relay $M_1$ which is responsive to the first energy level established on the capacitor bank 75 for energizing the firing circuit to discharge the capacitor bank and energize the winding 24 of the electrical inductive apparatus 26. Second sensing circuit means is provided and includes another meter relay $M_2$ responsive to the second energy level on the capacitor bank 75 for energizing the firing circuit to discharge the capacitor bank into the stator winding 16.

As will be seen in FIGURE 2, the circuit is connected by a standard three-conductor cord having a three-pronged plug 65 for insertion into a standard grounded type receptacle of the power source 17. An electrical energy pulse is provided at the output terminals 9 and 12 by switching an ignitron $I_2$ into conduction when the capacitor bank 75 is charged to a first predetermined level. The circuit also includes an ignitron $I_1$ which is utilized to suppress large oscillatory voltages which otherwise would flow reversely through the capacitor bank 75. Similarly, an electrical energy pulse is provided at the output terminals 9 and 14 by switching an ignitron $I_3$ into conduction when the capacitor bank 75 is charged to a second predetermined level.

In order to energize the circuit 5, the switch denoted by the letter S is closed, thereby energizing the relay coil 50 of a control relay designated $CR_5$. The circuit as illustrated in FIGURE 2 is in an unenergized condition since the switch S has not yet been closed, however the plug 65 connects the circuit to the source 17. In this unenergized condition of the circuit, the coils 10 and 30 of control relays $CR_1$ and $CR_3$ are energized since the meter pointers 67 and 67A of meters $M_1$ and $M_2$ respectively are in contact with the left-hand meter contacts 68 and 68A respectively thereby connecting the coils 10 and 30 across the hot lines $L_1$ and $L_2$. Since the control relays $CR_1$ and $CR_3$ are thus normally energized prior to closing switch S, the switch sections 11 and 31 are open in the circuit condition illustrated in FIGURE 2.

When the switch S is closed, the control relay $CR_5$ is energized as the relay coil 50 thereof is connected across the input lines $L_1$ and $L_2$ through normally closed switch sections 71 and 81. As the relay $CR_5$ is energized, normally open switch sections 51, 53, 55, and 57 are closed and normally closed switch sections 52, 54, and 56 are opened. The closing of switch section 51 provides a parallel path between the lines $L_1$ and $L_2$ and relay coil 50 to "seal" around the button S which opens upon release, and thus control relay $CR_5$ will remain energized.

The closing of switch section 55 energized the coils 90 and 100 of control relays $CR_9$ and $CR_{10}$ as they are connected across the input lines $L_1$ and $L_2$ through normally closed switch section 85. The closing of switch section 57 energizes a charging circuit means including the power source 17 and the primary winding $P_3$ of a transformer $T_3$. A choke coil $L_1$ is provided in series with the winding $P_3$ in order to limit the peak current therein. Further, the winding $P_1$ of a control autotransformer $T_1$ is also in series with primary winding $P_3$. The control autotransformer $T_1$ is preset in order to control the voltage applied across the primary winding $P_3$ of the autotransformer $T_3$ and thus the autotransformer $T_1$ controls the voltage level applied to the capacitor bank 75. The switch section 57 thereby effectively acts as a charge level control means since it controls the coupling of the voltage source in the form of transformer $T_1$ to the charging circuit means. To provide a full-wave rectified current for charging the capacitors $C_1$, $C_2$, and $C_3$, a pair of high voltage rectifiers $D_2$ and $D_3$ are connected across the secondary winding $S_3$ of the transformer $T_3$ in a well-known full-wave rectifier configuration. The full-wave rectified output is brought out at the center tap 76 of the secondary winding $S_3$ of transformer $T_3$.

Since the coil 90 of the control relay $CR_9$ was energized in response to initial energization of the charging circuit means 17 and T₃, the normally open switch sections 91, 92, and 93 thereof are thereby closed. When the switch section 91 closes, a parallel path is provided between the source 12 and relay coils 90 and 100 in order to "seal" around switch section 55 to insure that the control relays CR₉ and CR₁₀ remain energized even if switch section 55 were to open. The switch sections 92 and 93 comprise means for electrically short circuiting the stator winding 16, as when the switch sections 92 and 93 are closed, a closed path is provided between points 77 and 78 of the circuit and thus between output terminals 9 and 14.

As the relay coil 100 is energized, the normally open switch section 101 of relay CR₁₀ closes and the normally closed switch section 102 opens. As the switch section 101 closes, a means for coupling the capacitor bank 75 to the output terminals 9 and 12 is provided as the switch section 101 is connected through current limiting resistor R₅ to the starter rod 79 of the ignitron I₂. However, inasmuch as switch section 62 is open at this time, the path to starter rod 79 is not yet completed.

Each of the meter relays M₁ and M₂ includes a signal coil denoted by reference numerals 88 and 88A respectively as is well known in the art, which signal coils are connected in series with resistors R₁ and R₂ respectively and with ground. The serially connected meter relay M₁ and resistor R₁ and the serially connected meter relay M₂ and resistor R₂ are thereby in parallel with each other across the capacitor bank 75. The resistors R₁ and R₂ are used to reduce the current flow through the meter relays M₁ and M₂ to signal current values. As a charge is developed on the capacitors C₁, C₂, and C₃ of capacitor bank 75, the pointers 67 and 67A will be moved off the left-hand meter contacts 68 and 68A respectively in response to the charging of the capacitor bank, as sensed by the signal coils 88 and 88A. The ultimate energy level on the capacitor bank is sensed by the meter relays M₁ and M₂ inasmuch as the high level setting of meter relay M₁ is set slightly lower than the high level setting of meter M₂ to insure that the pointer 67 will engage contact 89 before the pointer 67A engages contact 89A. Further, as will become apparent hereinafter, the low level setting of meter M₁ is set slightly higher than the low limit of meter relay M₂ to insure that during the capacitor discharge cycle, contact 68 is engaged by pointer 67 before contact 68A is engaged by pointer 67A.

As the pointers 67 and 67A respectively move off of the contacts 68 and 68A in response to charging of the capacitor bank 75, the coils 10 and 30 are deenergized and the switch sections 11 and 31 of control relays CR₁ and CR₃ are closed. Also, as the voltage on the capacitor bank 75 increases, the capacitor C₄, in the firing circuit of ignitrons I₂ and I₃, is charged through voltage dividing resistors R₃ and R₄ for a purpose to be discussed more fully hereinafter.

The meter relay M₁ acts as a sensor responsive to the preselected energy level on capacitor bank 75 since the pointer 67 engages the right hand meter contact 89 in response to charging of the capacitor bank, thereby causing the coil 20 of control relay CR₂ to be energized and close the normally open switch section 21. When switch section 21 closes, a line to line connection through switch sections 53 and 83 and the coil 70 of control relay CR₇ is effected, thereby energizing coil 70 and causing the normally closed switch section 71 to open, and the normally open switch sections 72, 73 and 74 to close. As switch section 71 opens, the coil 50 of control relay CR₅ is deenergized and switch section 53 opens. However, inasmuch as the switch section 73 provides a parallel path between the source lines L₁ and L₂ and the coil 70, control relay CR₇ is maintained in energized condition. As the coil 50 of control relay CR₅ is deenergized, switch section 52 closes, in turn causing the coil 60 of control relay CR₆ to be energized. When the coil 60 is energized, normally closed switch section 61 opens and normally open switch section 62 closes. When switch section 62 closes, the previously charged firing capacitor C₄ is allowed to discharge through the now closed switch section 101 to the starter rod 79 of ignition I₂, rendering the ignitron I₂ conductive and thus allowing the capacitor bank 75 to discharge through the ignitron I₂ to output terminals 9 and 12 and into the winding 24 of the electrical inductive apparatus 26. This completes a first phase of the circuit operation, wherein the winding 24 is energized and the stator winding 16 is short circuited.

The condition of the circuit at the time when the capacitor bank 75 is discharging into the winding 24 is illustrated in simplified schematic form in FIGURE 3. It should be appreciated that only the circuit components necessary to illustrate the control portion of the circuit are shown in FIGURE 3. Referring specifically to that figure, it will be seen that meter M₁ is in series with the coils 10 and 20 of control relay CR₁ and CR₂, with the coil 20 energized inasmuch as the pointer 67 is contacting right hand meter contact 89. However, the coil 40 is not yet energized inasmuch as the pointer 67A of meter M₂ is not in contact with the right hand meter contact 89A. It is, of course, necessary for the operation of this exemplified circuit as explained above that the pointer 67 reach contact 89 before the pointer 67A reach contact 89A, as otherwise control relay CR₇ will not be energized and the circuit operation will be prematurely terminated.

It will be seen in FIGURE 3 that the coil 70 of CR₇ is energized through serially connected switch sections 83 and 73, and that the coil 50 of CR₅ is then deenergized by the opening of switch section 71. It will also be appreciated that relay coil 60 of CR₆ is energized as the switch 52 is closed in response to the deenergization of coil 50.

In order to understand the continued operation of the pulsing circuit 5 wherein automatic switching occurs enabling the capacitor bank to discharge into the stator winding 16 while the winding 24 is short circuited, attention should again be directed to FIGURE 2. As the charge on the capacitor bank 75 is bled off through the ignitron I₂ to output terminals 9 and 12 and into the winding 24, in response to this discharge, the pointers 67 and 67A will immediately begin to move away from right hand meter contacts 89 and 89A respectively. The relay coils 20 and 40 of control relay CR₂ and CR₄ are thereby immediately deenergized, opening switch sections 21 and 41 and closing switch section 42. As explained above, the low level setting of meter relay M₁ is set slightly higher than the low limit setting of meter relay M₂ and therefore when the meter pointers 67 and 67A fall or more to the left in response to the discharge of the capacitor bank 75, the pointer 67 will reach contact 68 before pointer 67A reaches contact 68A. When the pointer 67 reaches contact 68, the coil 10 is immediately energized before pointer 67A reaches contact 68A, thereby opening switch section 11 which in turn deenergizes coil 60, opening switch section 62 and closing switch section 61. Since the switch section 54 was previously closed, when switch section 61 closes, the coil 80 of control relay CR₈ is energized. In response to the energization of control relay CR₈, the normally closed switch sections 81, 82, 83 and 85 are opened and the normally open switch sections 84, 86 and 87 are closed. As switch section 83 is opened, the coil 70 of control relay CR₇ is deenergized, closing switch section 71 and opening switch sections 72, 73 and 74. The closing of switch section 84 keeps coil 80 energized as switch section 84 provides a parallel path to lines L₁ and L₂ for coil 80 around switch sections 74 and 31.

As the switch section 85 opens, the coils 90 and 100 of control relays CR₉ and CR₁₀ are deenergized, and switch sections 91, 92, and 101 open while switch section 102 closes. The switch section 102 provides a means for coupling the capacitor bank 75 to the output terminals 9 and 14, as the switch section 102 is connected through a resistor $R_6$ to the starter rod 95 of ignitron $I_3$. However, the path is not yet completed as switch section 62 is as yet not closed. Since switch section 86 is closed, however, the coil 110 of control relay $CR_{11}$ is energized, closing switch sections 111, 112, and 113. The switch sections 112 and 113 thereby comprise means responsive to the discharge of bank 75 for electrically short circuiting the winding 24, as the switch sections 112 and 113 provide a closed path between the points 77 and 78A of the circuit and thus between output terminals 9 and 12. Further, as switch section 87 is closed, the primary winding $P_3$ of the charging circuit means or transformer $T_3$ is energized through the choke $L_1$ and through the autotransformer $T_2$, which is preferably set at a different voltage level than the autotransformer $T_1$. The switch section 87 thereby acts as a second charge level control means since it, similarly to switch section 57, controls the coupling of the voltage source $T_2$ to the charging circuit means. At this time, the capacitors $C_1$, $C_2$, and $C_3$ of capacitor bank 75 begin to charge through the rectifier tubes $D_2$ and $D_3$ as the secondary winding $S_3$ of transformer $T_3$ conducts, and the firing capacitor $C_4$ is again charged.

As the voltage on the capacitor bank 75 increases, the meter pointers 67 and 67A again move off left hand contacts 68 and 68A, moving towards the right hand contacts 89 and 89A. As before described, the pointer 67 of meter $M_1$ reaches contact 89 before meter pointer 67A reaches contact 89A. However, during this phase of the circuit operation, when relay coil 20 is energized upon pointer 67 reaching contact 89, switch section 21 closes, but relay coil 70 cannot be energized as described in the initial operation of the circuit, since switch sections 53 and 83 are now open rather than closed as before. Thus, the voltage on the capacitor bank 75 will continue to increase until the preset meter $M_2$ senses the desired voltage level on the bank 75 as the pointer 67A reaches contact 89A. At this time, the coil 40 of control relay $CR_4$ is energized thereby closing switch section 41 and opening switch section 42. As switch section 42 opens, the coil 80 of control relay $CR_8$ is deenergized closing switch sections 81, 82, 83 and 85 while opening switch sections 84 and 86. The closing of switch section 82 enables the coil 60 of relay $CR_6$ to be energized, opening switch section 61 and closing switch section 62. Similarly to the initial circuit operation, when switch section 62 closes, the firing capacitor $C_4$ is allowed to discharge through the then closed switch section 102 to the starter rod 95 of ignitron $I_3$, rendering the ignitron $I_3$ conductive and discharging the capacitor bank into the stator winding 16. Thus, it should be readily apparent that by a complete cycle of the circuit 5, the winding 24 is pulsed with the winding 16 shorted, and then the winding 16 is pulsed with the winding 24 shorted. This is, of course, the desired pulsing sequence to practice the Gibbs method.

Reference may now be made to FIGURE 4 wherein there is illustrated in simplified schematic form the circuit condition when the capacitor bank 75 is discharging into the stator winding 16. As seen in FIGURE 4, pointer 67A of meter $M_2$ is in engagement with meter contact 89A and hence coil 40 of $CR_4$ is energized, with switch section 41 closed and switch section 42 open. Further, the coil 110 of $CR_{11}$ is energized since switch sections 56 and 111 are closed, and the coil 60 of $CR_6$ is energized since switch sections 52 and 82 and 41 are closed.

The above description should serve to explain one complete operating cycle of the pulsing circuit 5, with the circuit being returned to its initial condition upon the discharge of capacitor bank 75 into stator winding 16, except that the coil 110 of control relay $CR_{11}$ remains energized since switch section 111 is closed. However, the next time the switch S is closed energizing coil 50 and thereby opening switch section 56, the coil 110 will be deenergized and the next sequence of the pulsing circuit 5 will be identical to that previously described.

By way of a more specific illustration of a pulsing circuit which was actually used, the following identified components may be used in the circuit illustrated in FIGURE 2:

| Component identification: | Specification of component |
|---|---|
| Variable autotransformers $T_4$, $T_5$ | General Electric 9T92Y9. |
| Transformer $T_3$ | General Electric 9T45Y2754LA. |
| Filament transformers $T_4$, $T_5$ | Stancor P–6433; P–6135. |
| Ignitrons $I_1$, $I_2$, $I_3$ | GL–7171. |
| Capacitors $C_1$, $C_2$, $C_3$ | 210 microfarads (rated, 5 KV. |
| Capacitor $C_4$ | 0.50 microfarad, 3 KV. |
| Choke $L_1$ | General Electric 9T45Y4506LA. |
| Resistor $R_4$ | 3 megohms. |
| Resistor $R_3$ | 2 megohms. |
| Resistors $R_5$, $R_6$ | 10 ohms, 10 watts. |
| Rectifiers $D_1$, $D_2$, $D_3$ | Mercury vapor 872A. |
| Control relays $CR_1$–$CR_{11}$ | General Electric CR2810; CR2790. |
| Meters $M_1$, $M_2$ | Assembly products optical meter relay, Mod. 303–L. |

In conclusion, it should be appreciated that my present invention provides an improved circuit arrangement including automatic switching means for sequentially applying high energy pulses of electrical energy into a first and then a second load while the unenergized loads are short circuited. While this circuit is especially effective in practicing the aforementioned Gibbs method to force back coils relative to the cores which carry them, it will also find utility for various other desired switching operations. In this regard, it will be appreciated that at least a portion, but not all of one of the loads may be arranged in series circuit with the other load, and hence also energized when the other load is energized, and then, when the circuit switching operation takes place, the remaining portion of the one load may be energized. This may be accomplished by proper connections of the windings 16 and 24 to the terminals 9, 12 and 14 and to each other. Further, while the circuit arrangement as illustrated, automatically and sequentially injects only one energy pulse into each load, it will be apparent to those skilled in the art that the circuit may be modified ot inject more than one pulse into each load, or that it may be modified to repeat or reverse the pulsing sequence.

While I have shown and described one embodiment of my invention, it will be obvious to those skilled in the art that other changes and modifications may be made without departing from the invention. It is therefore intended in the appended claims to cover all such changes and modifications that fall within the true spirit and scope of my invention.

What I claim as new and desire to secure by Letters Patent of the United States is:

1. In an energy discharge circuit for displacing a winding of an inductive device, said circuit including a primary winding in transformer-coupled relationship with the winding of the inductive device, the combination comprising an energy storage means, charging circuit means for charging said energy storage means to preselected energy levels, a firing circuit for discharging said energy storage means, first and second voltage sources, a control circuit including a first charge level control means for coupling said first voltage source to said charging circuit thereby to charge said energy storage means to a first preselected level, said control circuit also including a second charge level control means for coupling said second voltage source to said charging circuit thereby to charge said energy storage means to a second preselected level, a switching circuit including means responsive to initial energization of said charging circuit means for short circuiting the winding of the inductive device and means for coupling the energy storage means to the primary winding, said switching circuit also including means responsive to the discharge of said energy storage means for short circuiting the primary winding and coupling the energy storage means to the winding of the inductive device, first energy level sensing circuit means responsive to the first preselected energy level of said energy storage means for energizing said firing circuit to discharge said energy storage means and energize the primary winding, and a second sensing circuit means responsive to the second preselected energy level on said energy storage means for energizing said firing circuit to discharge said energy storage means into the winding of the inductive device.

2. An electrical pulsing circuit for sequentially supplying energy pulses to first and second windings, the circuit comprising: electrical energy storage means; first and second voltage sources; control circuit means for initially connecting said first voltage source to said energy storage means thereby to store a first preselected level of energy on said energy storage means; means responsive to the initial connection of said first voltage source to said energy storage means for short circuiting the second winding; means responsive to the first preselected level of energy on said energy storage means for connecting said energy storage means to said first winding thereby enabling said energy storage means to discharge into said first winding, switching means for connecting said control circuit means in circuit with said second voltage source and said energy storage means in response to the discharging of said energy storage means thereby to store a second preselected level of energy on said energy storage means, means responsive to the discharge of said energy storage means for electrically short circuiting the first winding, and means responsive to the second preselected level of energy on said energy storage means for connecting said energy storage means to the second winding thereby enabling said energy storage means to discharge into said second winding.

3. The electrical pulsing circuit of claim 2 wherein said means for connecting said energy storage means to said first winding includes first relay means having a coil connected to the energy storage means and a pointer responsive to the energization of said coil and adapted to complete a circuit between said energy storage means and said first winding, said means for connecting said energy storage means to said second winding including a second relay means having a coil connected to the energy storage means and a pointer responsive to the energization of said second wound coil and adapted to complete a circuit between said energy storage means and said second winding.

4. An electrical circuit for sequentially injecting energy surges into first and second load circuits comprising: energy storage means, a first voltage source for charging said energy storage means to a first preselected level, a second voltage source for charging said energy storage means to a second preselected level, first charge level control means for coupling said first voltage source to said energy storage means thereby to charge said energy storage means to a first preselected level, a first switch means for electrically short circuiting the second load circuit and for coupling the energy storage means to the first load circuit, second charge level control means for coupling said second voltage source to said energy storage means thereby to charge said energy storage means to a second preselected level, a second switch means for electrically short circuiting the first load circuit and for coupling the energy storage means to the second load circuit, a firing circuit for discharging said energy storage means, and means for selectively discharging said energy storage means into said first and second load circuits.

5. The electrical circuit of claim 4 wherein said discharging means includes first sensing means for sensing the first preselected level of said energy storage means and thereby energizing said firing circuit to discharge said energy storage means and energize the first load circuit, and second sensing means for sensing the second preselected level of said energy storage means and thereby energizing said firing circuit to discharge said energy storage means and energize the second load circuit.

6. An electric circuit for sequentially injecting energy pulses into first and second windings comprising: a first energy source means for supplying energy at a first level, a second energy source means for supplying energy at a second level, control means for selectively coupling a energy storage means to either said first or said second energy source means to bring said energy storage means to said first level or said second level, means for sensing the level of energy of said energy storage means, means responsive to the first level of said energy storage means as sensed by said sensing means for discharging said energy storage means into said first winding, and means responsive to the second level of said energy storage means as sensed by said sensing means for discharging said energy storage means into said second winding.

7. The electric circuit of claim 6 including first switching means for electrically short circuiting the second winding and for coupling the energy storage means to the first winding, and second switching means for electrically short circuiting the first winding and for coupling the energy storage means to the second winding.

References Cited

UNITED STATES PATENTS 3,223,968   12/1965   De Shazo _____ 340—18

ROBERT K. SCHAEFER, *Primary Examiner.*

H. J. HOHAUSER, *Assistant Examiner.*

U.S. Cl. X.R.

307—104